United States Patent
Takemoto et al.

(10) Patent No.: US 12,222,222 B2
(45) Date of Patent: Feb. 11, 2025

(54) SENSOR COVER AND SENSOR MODULE

(71) Applicant: AGC Inc., Tokyo (JP)

(72) Inventors: Kazuya Takemoto, Tokyo (JP); Atsushi Koyanagi, Tokyo (JP); Naoto Tatsuoka, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 18/625,325

(22) Filed: Apr. 3, 2024

(65) Prior Publication Data

US 2024/0263974 A1    Aug. 8, 2024

Related U.S. Application Data (63) Continuation of application No. PCT/JP2022/038327, filed on Oct. 14, 2022.

(30) Foreign Application Priority Data

Oct. 22, 2021  (JP) .................. 2021-173364

(51) Int. Cl.
*G01D 11/24* (2006.01)
*G02B 5/28* (2006.01)
*H05B 3/16* (2006.01)

(52) U.S. Cl.
CPC ........... *G01D 11/245* (2013.01); *G02B 5/281* (2013.01); *H05B 3/16* (2013.01)

(58) Field of Classification Search
CPC ......... G01D 11/245; G02B 5/281; H05B 3/16
See application file for complete search history.

(56) References Cited

U.S. PATENT DOCUMENTS

| | | |
|---|---|---|
| 2006/0220541 A1 | 10/2006 | Koyama |
| 2022/0381962 A1 | 12/2022 | Sahara et al. |
| 2023/0038038 A1 | 2/2023 | Mielke et al. |

FOREIGN PATENT DOCUMENTS

| | | | | |
|---|---|---|---|---|
| CN | 112596289 A | 4/2021 | | |
| JP | 4-110996 U | 9/1992 | | |
| JP | 2006278213 A | * 10/2006 | ......... | H01L 51/0005 |
| JP | 6904392 B2 | 7/2021 | | |
| WO | WO-2018052057 A1 | * 3/2018 | | |
| WO | WO 2018/061886 A1 | 4/2018 | | |
| WO | WO 2020/195247 A1 | 10/2020 | | |
| WO | WO 2021/117598 A1 | 6/2021 | | |

OTHER PUBLICATIONS

Decision to Grant mailed on Jun. 4, 2024, issued in Japanese Patent Application No. 2023-554641, with Machine-generated English Translation, total 5 pages.
Notice of Reasons of Refusal mailed on Apr. 23, 2024 issued in Japanese Patent Application No. 2023-554641, with Machine-generated English Translation, total 9 pages.

* cited by examiner

*Primary Examiner* — Jamel E Williams
(74) *Attorney, Agent, or Firm* — Oblon, McClelland, Maier & Neustadt, L.L.P.

(57) ABSTRACT

A sensor cover, provided in an opening of a housing that houses a sensor, includes a conductor; a dielectric multilayer film; and a heating film, in a desired order from an outside of the housing toward an inside of the housing. The conductor and the heating film are insulated from each other. A shortest distance between the conductor and the heating film is 2.0 μm or more.

11 Claims, 6 Drawing Sheets

SENSOR COVER AND SENSOR MODULE

CROSS-REFERENCE TO RELATED APPLICATION

The present application is a continuation application of International Application No. PCT/JP2022/038327, filed Oct. 14, 2022, which claims priority to Japanese Patent Application No. 2021-173364 filed Oct. 22, 2021. The contents of these applications are incorporated herein by reference in their entirety.

BACKGROUND OF THE INVENTION

1. Field of the Invention

The present disclosure relates to a sensor cover and a sensor module.

2. Description of the Related Art

A sensor cover is provided at an opening of a housing that houses a sensor such as a light detection and ranging (LiDAR) sensor. The sensor cover is, for example, a band-pass filter, which transmits near-infrared rays and blocks visible light. WO 2021/117598 discloses a band-pass filter using a dielectric multilayer film.

SUMMARY OF THE INVENTION

Problems to be Solved by the Invention

The sensor cover has a heating film to prevent snow accumulation, ice formation or dew condensation. The heating film is electrically connected to a power source. The sensor cover may have a conductive film in addition to the heating film. The conductive film is provided, for example, as a countermeasure against electromagnetic compatibility (EMC) and is electrically connected to ground.

An aspect of the present disclosure provides a technique for suppressing a short circuit between a conductor and a heating film that are included a sensor cover.

Means for Solving the Problems

A sensor cover according to an aspect of the present disclosure is provided in an opening of a housing that houses a sensor. The sensor cover includes a conductor, a dielectric multilayer film, and a heating film in a desired order from an outside of the housing toward an inside of the housing. The conductor and the heating film are insulated from each other. A shortest distance between the conductor and the heating film is 2.0 μm or more.

Effects of the Invention

According to the aspect of the present disclosure, since the shortest distance between the conductor and the heating film which are insulated from each other is 2.0 μm or more, it is possible to suppress a short circuit between the conductor and the heating film.

BRIEF DESCRIPTION OF THE DRAWINGS

Other objects and further features of the present disclosure will be apparent from the following detailed description when read in conjunction with the accompanying drawings, in which.

DESCRIPTION OF THE EMBODIMENT

Hereinafter, embodiments of the present disclosure will be described with reference to the drawings. In the drawings, the same or corresponding components are denoted by the same reference numerals, and the description thereof may be omitted. In the specification, "to" indicating a numerical range means that numerical values described before and after "to" are included as a lower limit value and an upper limit value.

First Embodiment

First, a sensor module 1 according to an embodiment will be described with reference to FIG. 1. The sensor module 1 includes a sensor cover 2, a housing 3, and a sensor 5. The housing 3 houses the sensor 5. The housing 3 may function as frame ground. In this case, the housing 3 is formed of a conductive material such as metal. The sensor 5 is not particularly limited. The sensor 5 is, for example, an in-vehicle sensor. The in-vehicle sensor is, for example, a light detection and ranging (LiDAR) sensor.

The LiDAR sensor irradiates an object with near-infrared rays and receives the near-infrared rays reflected by the object, thereby detecting a distance to the object and a direction of the object. Although not illustrated, the LiDAR sensor includes, for example, a laser light source, an irradiation optical system that irradiates an object with near-infrared rays from the laser light source, a light receiving unit, and a light receiving optical system that guides the near-infrared rays reflected by the object to the light receiving unit. The in-vehicle sensor is not limited to the LiDAR sensor, and may be an imaging sensor such as a CCD imaging sensor or a CMOS imaging sensor.

The light detected by the sensor 5 is preferably near-infrared ray. Near-infrared rays are electromagnetic waves having wavelengths in the range of 700 nm to 2,500 nm. As near-infrared rays for LiDAR sensors, near-infrared rays having wavelengths in the range of 1,530 nm to 1,570 nm are currently being studied. Note that light detected by the sensor 5 is near-infrared ray in the present embodiment. However, the light is not limited to near-infrared ray, and may be, for example, visible light or ultraviolet light. The sensor 5 is not limited to the in-vehicle sensor. The sensor 5 may be an optical sensor.

Next, the sensor cover 2 according to the embodiment will be described with reference to FIGS. 1 and 2. The sensor cover 2 is provided in the opening of the housing 3, and prevents snow, rain, dust, and the like from entering the housing 3 to protect the sensor 5. The sensor cover 2 is, for example, an infrared pass filter that transmits near-infrared rays and blocks visible light. When the light detected by the sensor 5 is near-infrared ray, the sensor 5 has high sensitivity. Further, by blocking visible light, the sensor 5 can be made invisible from the outside of the housing 3.

The sensor cover 2 includes a substrate 21, a conductive film 22, a dielectric multilayer film 23, and a heating film 24 are provided in a desired order from the outside of the housing 3 toward the inside of the housing 3. For example, the sensor cover 2 includes the substrate 21, the conductive film 22, the dielectric multilayer film 23, and the heating film 24 in this order from the outside of the housing 3 toward the inside of the housing 3.

(Substrate)

The substrate 21 is used for forming the conductive film 22 and the dielectric multilayer film 23. The substrate 21 is, for example, plate-shaped. The thickness of the substrate 21 is preferably from 0.1 mm to 5 mm, and more preferably from 2 mm to 4 mm, from the viewpoint of (A) reducing warpage that may occur upon forming the conductive film 22, the dielectric multilayer film 23, and the like, (B) reducing the thickness, and (C) suppressing cracking. The shape of the substrate 21 is not particularly limited.

The material of the substrate 21 is not particularly limited, and may be an organic material or an inorganic material as long as the material transmits light to be detected by the sensor 5. The substrate 21 may be a composite of a plurality of different materials. The substrate 21 may have a single-layer structure or a multilayer structure. As the inorganic material of the substrate 21, glass or a crystalline material is preferably used.

The glass is, for example, soda lime glass, borosilicate glass, alkali-free glass, quartz glass, or aluminosilicate glass. The glass may be chemically strengthened glass. The chemically strengthened glass is obtained by forming a compressive stress layer on a glass surface by ion exchange at a temperature equal to or lower than the glass transition point. The compressive stress layer is formed by exchanging alkali metal ions having a small ion radius contained in the glass with alkali ions having a larger ion radius.

The crystalline material may be a birefringent crystal, and is, for example, silicon dioxide, lithium niobite, or sapphire.

The substrate 21 may be formed of a conductive material and may have a function of a conductive film 22 described below.

(Conductive Film)

The conductive film 22 is provided, for example, as a countermeasure against the electromagnetic compatibility (EMC), and is electrically connected to ground. The ground is, for example, the housing 3. The housing 3 and the conductive film 22 are bonded to each other with a conductive adhesive 29. The conductive adhesive 29 may be a general adhesive. The conductive adhesive 29 is provided, for example, on the periphery of the conductive film 22. When the sensor 5 is an in-vehicle sensor, a vehicle body may serve as the ground.

The conductive film 22 is not particularly limited as long as the conductive film 22 is formed of a material that transmits light to be detected by the sensor 5. The conductive film 22 may be a composite of a plurality of different materials. The conductive film 22 may have a single-layer structure or a multilayer structure. The conductive film 22 is preferably formed of a conductive oxide. The conductive oxide is, for example, indium-tin oxide (ITO), indium-zinc oxide (IZO), indium-gallium-zinc oxide (IGZO), Al-doped zinc oxide (AZO), Ga-doped zinc oxide (GZO), or F-doped tin oxide (FTO).

(Dielectric Multilayer Film)

The dielectric multilayer film 23 is, for example, an infrared pass filter that transmits near-infrared rays and blocks visible light. The dielectric multilayer film 23 may also serve as an antireflection film for preventing reflection of near-infrared rays in order to improve the transmittance of near-infrared rays. The antireflection film is in contact with air and prevents reflection of near-infrared rays at the interface between air and the sensor cover 2. The dielectric multilayer film 23 prevents reflection of light propagating from the inside of the housing 3 toward the outside of the housing 3, for example.

The dielectric multilayer film 23 includes a high refractive index film and a low refractive index film alternately, and can increase and decrease the reflectance by utilizing the interference of light. The transmittance decreases as the reflectance increases. The transmittance also depends on the extinction coefficient. The extinction coefficient is determined by the type of material. The larger the extinction coefficient, the higher the absorption rate and the lower the transmittance.

Either one of the high refractive index film and the low refractive index film (preferably the high refractive index film) preferably satisfies the following optical characteristics (1) and (2).

(1) The extinction coefficient $k_{600}$ at the wavelength of 600 nm is 0.12 or more; and
(2) The minimum extinction coefficient $k_{1530\text{-}1570MIN}$ in the range of wavelengths of from 1, 530 nm to 1, 570 nm is 0.01 or less.

(1) When the extinction coefficient $k_{600}$ is 0.12 or more, red lights near 600 nm can be blocked by absorption. An optical filter is obtained by which the reflect light is less likely to exhibit red than the case where red light near 600 nm is blocked by reflection. The extinction coefficient $k_{600}$ is preferably 0.18 or more, and preferably 1.00 or less. Example of the materials having the extinction coefficient $k_{600}$ in the above range include amorphous silicon having a hydrogen-doping amount equal to or less than 20 sccm.

(2) When the minimum extinction coefficient $k_{1530\text{-}1570MIN}$ is 0.01 or less, the dielectric multilayer film 23 can transmit near-infrared rays having wavelengths in around 1, 530 nm to 1, 570 nm sufficiently. The minimum extinction coefficient $k_{1530\text{-}1570MIN}$ is preferably 0.002 or less.

Either one of the high refractive index film and the low refractive index film (preferably the high refractive index film) further satisfies the following optical characteristic (3).

(3) The minimum extinction coefficient $k_{800\text{-}1000MIN}$ in the range of wavelengths from 800 nm to 1,000 nm is 0.0005 or more.

(3) When the minimum extinction coefficient $k_{800\text{-}1000MIN}$ is 0.0005 or more, the value of the extinction coefficient $k_{600}$ is made suitably large, and red lights near 600 nm can be blocked by absorption. The minimum extinction coefficient $k_{800\text{-}1000MIN}$ is preferably 0.001 or more, and preferably 0.1 or less.

The film satisfying the above characteristics (1) and (2) is preferably the high refractive index film from the viewpoint of the degree of freedom in design. In this case, the extinction coefficient $k_{600}$ of the low refractive index film is preferably 0.015 or more, and the extinction coefficient $k_{1530\text{-}1570MIN}$ is preferably 0.

The refractive index of the high refractive index film is preferably 3.5 or more, and more preferably 4.0 or more. The material of the high refractive index film is, for example, silicon, $Ta_2O_5$, $TiO_2$, $Nb_2O_5$, or SiN. Among these materials, from the viewpoints of the above optical characteristics (1) and (2), silicon is preferable, amorphous silicon is particularly preferable, and amorphous silicon having a hydrogen-doping amount of 20 sccm or less is further preferable.

The refractive index of the low refractive index film is preferably 2.5 or less, and more preferably 1.5 or less. Examples of the material of the low refractive index film include $SiO_2$, $SiO_xN_y$, $Ta_2O_5$, $TiO_2$, and SiO. Among these materials, $SiO_2$ is preferable from the viewpoint of productivity.

The total number of the laminated layers of the high refractive index films and the low refractive index films is preferably 10 or more, more preferably 15 or more, and still more preferably 20 or more, so that visible light can be efficiently blocked. However, when the total number of laminated layers is increased, warpage or the like may occur, or the film thickness is increased. Therefore, the total number of laminated layers is preferably 70 or less, more preferably 60 or less, and still more preferably 50 or less.

The thickness of the dielectric multilayer film 23 is, from the viewpoint of productivity, preferably 1.5 µm or less, and more preferably 2.0 µm or less.

The dielectric multilayer film 23 preferably further satisfies the following optical characteristics. In order to make both the transmitted color and the reflected color of visible light black, the maximum value of the transmittance $T_{400\text{-}680MAX}$ in the wavelength region of from 400 nm to 680 nm is 6% or less, and the maximum value of the reflectance $R_{400\text{-}680MAX}$ in the wavelength region of from 400 nm to 680 nm is 10% or less. In order to increase the sensitivity of the sensor 5, the minimum value of the transmittance $T_{1530\text{-}1570MIN}$ in the wavelength region of from 1,530 nm to 1,570 nm is 90% or more.

The dielectric multilayer film 23 may be formed by a dry method or a wet method. The dry film forming method is, for example, a CVD method, a sputtering method, or a vacuum vapor deposition method. The wet film forming method is, for example, a spray method or a dip method.

Although not shown, a dielectric multilayer film other than the dielectric multilayer film 23 may be provided. The other dielectric multilayer film has optical characteristics different from those of the dielectric multilayer film 23. For example, the dielectric multilayer film 23 transmits near-infrared rays and blocks visible light, whereas the other dielectric multilayer film may transmit both near-infrared rays and visible light.

In the present embodiment, although the dielectric multilayer film 23 also serves as an antireflection film that prevents reflection of near-infrared rays, the dielectric multilayer film 23 need not serve as an antireflection film. When the dielectric multilayer film 23 does not serve as an antireflection film, an antireflection film may be provided on the dielectric multilayer film 23. The antireflection film may have, for example, a moth-eye structure in which the effective refractive index continuously changes from air toward the dielectric multilayer film 23, or may have a refractive index intermediate between those of the air and the dielectric multilayer film 23.

Note that, although the dielectric multilayer film 23 in the present embodiment transmits near-infrared rays, the dielectric multilayer film 23 may transmit light having a wavelength to be detected by the sensor 5, and may transmit visible light or the like. Although the dielectric multilayer film 23 in the present embodiment blocks visible light, the dielectric multilayer film 23 need not block visible light.

(Heating Film)

The heating film 24 heats an outer surface of the sensor cover 2 by generating heat, and prevents snow accumulation, ice formation, or dew condensation on the outer surface. The heating film 24 is disposed so as not to interfere with light emitted from the sensor 5 and light to be detected by the sensor 5, and is formed in a linear shape, for example. The heating film 24 is electrically connected to the power supply 6. The power supply 6 supplies a current to the heating film 24 by applying a voltage to the heating film 24. The heating film 24 generates heat by Joule heat.

The heating film 24 is preferably a metal film. The metal film is formed of, for example, a pure metal or an alloy containing at least one element selected from the group consisting of silver (Ag), gold (Au), copper (Cu), aluminum (Al), tin (Sn), iron (Fe), nickel (Ni), chromium (Cr), and tungsten (W). The heating film 24 may be a carbon film.

The heating film 24 may be formed by firing a conductive paste, or may be formed by processing a metal foil or a metal wire. The heating film 24 is provided, for example, on the inner side of the housing 3 with respect to the substrate 21. The substrate 21 protects the heating film 24 and suppresses, for example, disconnection of the heating film 24. The heating film 24 is provided on, for example, a part of the surface of the dielectric multilayer film 23 in contact with air.

(Second Dielectric Multilayer Film)

The sensor cover 2 may be provided with a second dielectric multilayer film 25 on the opposite side of the dielectric multilayer film 23 with respect to the substrate 21. The sensor cover 2 includes the second dielectric multilayer film 25, the substrate 21, the conductive film 22, the dielectric multilayer film 23, and the heating film 24 in this order from the outside of the housing 3 toward the inside of the housing 3. The second dielectric multilayer film 25 may be omitted, and the dielectric multilayer film 23 may be provided at the position of the second dielectric multilayer film 25.

The second dielectric multilayer film 25 is, for example, an infrared pass filter that transmits near-infrared rays and blocks visible light, similarly to the dielectric multilayer film 23. The second dielectric multilayer film 25 may also serve as an antireflection film for preventing reflection of near-infrared rays in order to improve the transmittance of near-infrared rays. The second dielectric multilayer film 25 prevents reflection of light propagating from the outside of the housing 3 toward the inside of the housing 3.

The configuration of the second dielectric multilayer film 25 is the same as the configuration of the dielectric multilayer film 23, and thus the description thereof will be omitted.

(Insulation)

The conductive film 22 and the heating film 24 are insulated from each other to prevent electric leakage from the heating film 24 to the conductive film 22. Thus, current can be efficiently supplied to the heating film 24, and the heating film 24 can be efficiently heated. Further, when the conductive film 22 is electrically connected to the ground, the potential of the conductive film 22 can be maintained at the reference potential. Unlike the heating film 24, the conductive film 22 is not a film, to which a voltage is applied, and which generates heat. The conductive film 22 is maintained at an equal potential as a whole, unlike the heating film 24.

The shortest distance $L_{min}$ between the conductive film 22 and the heating film 24 is 2.0 µm or more. When the distance $L_{min}$ is 2.0 µm or more, the electrical resistance between the heating film 24 and the conductive film 22 is high, and the electric leakage from the heating film 24 to the conductive film 22 can be suppressed. The distance $L_{min}$ is preferably 5 μm or more. The distance $L_{min}$ is 0.3 mm or less from the viewpoint of productivity.

The current value $I_{12V}$ when the voltage 12 V is applied to the shortest path between the conductive film 22 and the heating film 24 is preferably 1.0 mA (1.0×10⁻³ A) or less. When the current value $I_{12V}$ is 1.0 mA or less, the electric resistance between the heating film 24 and the conductive film 22 is high, and the electric leakage from the heating film 24 to the conductive film 22 can be suppressed. The current value $I_{12V}$ is preferably 0.1 mA or less. The current value $I_{12V}$ may be 0 mA.

The resistance value of the shortest path between the conductive film 22 and the heating film 24 is preferably $1.2×10^4 Ω$ or more, and more preferably $1.2×10^5 Ω$ or more.

In the present embodiment, the shortest path between the conductive film 22 and the heating film 24 is parallel to the thickness direction of the conductive film 22 (horizontal direction in FIG. 1), but may be inclined as described later. The thickness direction of the conductive film 22 is a stacking direction of the conductive film 22 and the heating film 24.

For example, a dielectric multilayer film 23 is provided between the conductive film 22 and the heating film 24. The dielectric multilayer film 23 is an insulating film. As described above, the thickness of the dielectric multilayer film 23 is preferably 1.5 μm or less, and more preferably 1.0 μm or less, from the viewpoint of productivity. It is difficult to set $L_{min}$ to 2.0 μm or more only by the thickness of the dielectric multilayer film 23.

Therefore, the sensor cover 2 may include an insulating film 26 between the dielectric multilayer film 23 and the heating film 24. The film thickness of the insulating film 26 is preferably 0.5 μm or more, and more preferably 1.0 μm or more. The total thickness of the dielectric multilayer film 23 and the insulating film 26 may be 2.0 μm or more.

The larger the film thickness of the insulating film 26, the more the electric leakage from the heating film 24 to the conductive film 22 can be suppressed. The thickness of the insulating film 26 is preferably larger than the thickness of the dielectric multilayer film 23. The thickness of the insulating film 26 is preferably 0.3 mm or less from the viewpoint of the productivity of the sensor cover 2.

Figure 2:
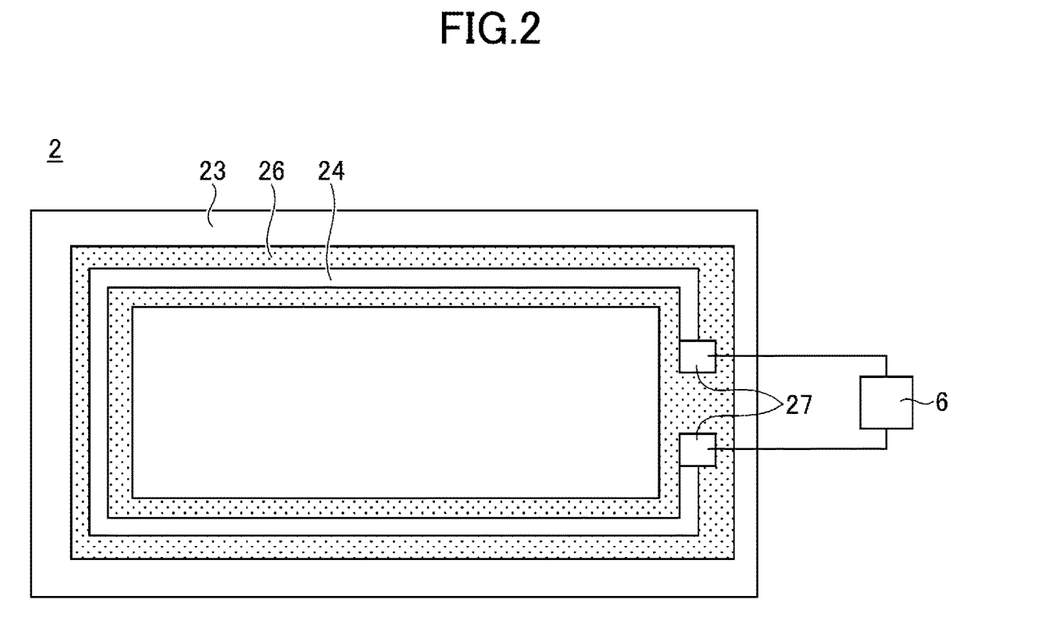
FIG. 2 is a rear view of a sensor cover according to the embodiment of the present disclosure.

The insulating film 26 may be provided in a band shape along the linearly-shaped heating film 24 as shown in FIG. 2, for example, so as not to interfere with the light to be detected by the sensor 5. The insulating film 26 has a ring shape, but may have a C shape. The width of the insulating film 26 may be wider than the width of the heating film 24, and the heating film 24 is disposed on the insulating film 26 so as not to extend outside the insulating film 26, for example.

Electrodes 27 are provided at both ends of the heating film 24. A pair of electrodes 27 electrically connect the heating film 24 to the power supply 6. The pair of electrodes 27 are also disposed on the insulating film 26 so as not to extend outside the insulating film 26, similarly to the heating film 24.

The material of the insulating film 26 may be an organic material or an inorganic material, and is not particularly limited. The insulating film 26 may be a composite of a plurality of different materials. The insulating film 26 may have a single-layer structure or a multi-layer structure. The material of the insulating film 26 may be either an organic material or an inorganic material, or may be a mixture of these materials. Examples of the organic material include epoxy resin, phenol resin, silicone resin, urethane resin, polyester resin, and polyimide resin. The inorganic material may be any of glass, ceramic, or silicon. Examples of the glass include soda lime glass, alumina silicate glass, and borosilicate glass. The ceramic may be silicon dioxide ($SiO_2$) or titanium dioxide ($TiO_2$). When the heating film 24 is a film heater, the material of the insulating film 26 is preferably an organic material, and particularly preferably a polyethylene terephthalate resin (PET resin), a polycarbonate resin, an acrylic resin, a polyethylene resin, a polyvinyl chloride resin (PVC resin), or a polyimide resin.

The second dielectric multilayer film 25 may be omitted, and the dielectric multilayer film 23 may be provided at the position of the second dielectric multilayer film 25. Then, the insulating film 26 alone may be present between the conductive film 22 and the heating film 24. In this case, when the thickness of the insulating film 26 is 2.0 μm or more, $L_{min}$ is 2.0 μm or more, and thus it is possible to suppress the electric leakage from the heating film 24 to the conductive film 22.

(First Variation)

Figure 3:
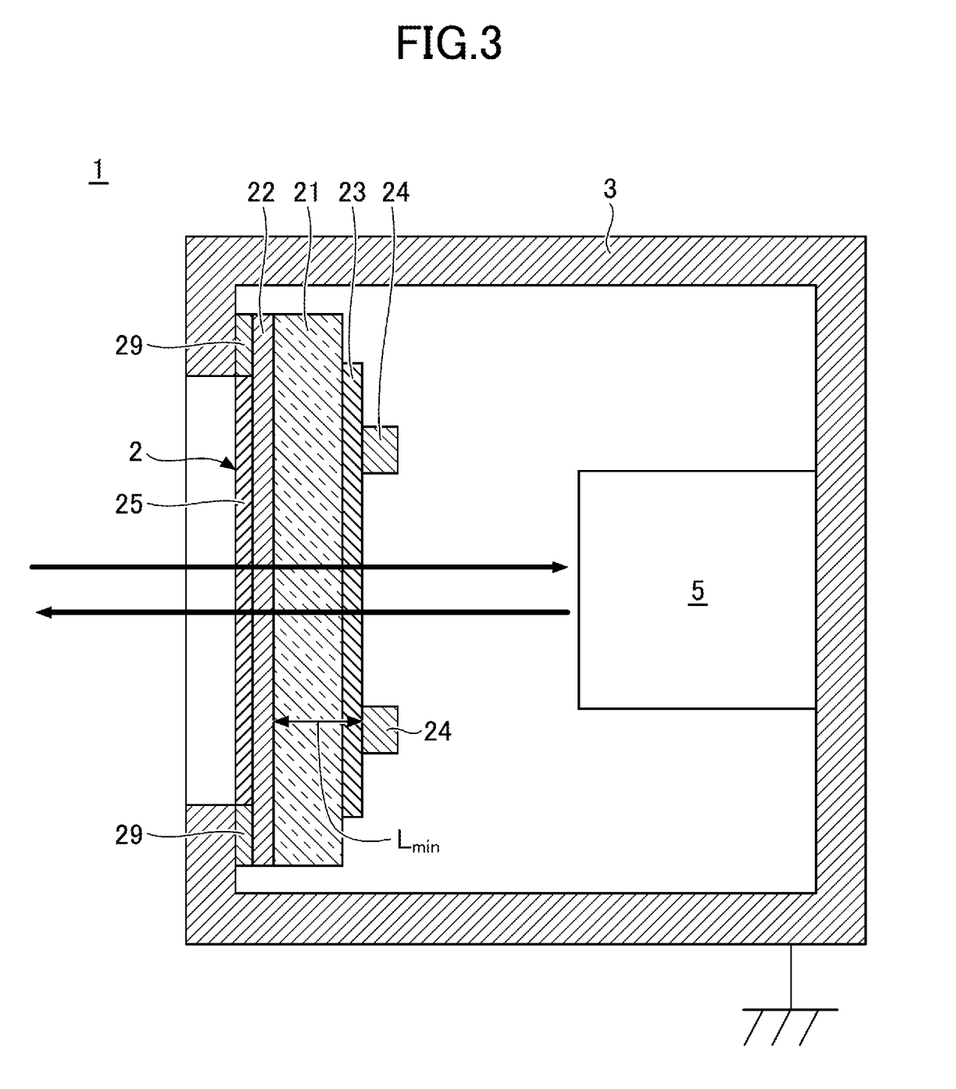
FIG. 3 is a cross-sectional view of a sensor module according to a first variation.

Next, a sensor cover 2 according to a first variation will be described with reference to FIG. 3. The following description will be focused on the differences. As shown in FIG. 3, the sensor cover 2 may include a second dielectric multilayer film 25, a conductive film 22, a substrate 21, a dielectric multilayer film 23, and a heating film 24 in this order from the outside of the housing 3 toward the inside of the housing 3. The second dielectric multilayer film 25 may be omitted.

The substrate 21 has an insulating property and insulates the heating film 24 from the conductive film 22. The thickness of the substrate 21 is larger than the thickness of the dielectric multilayer film 23. Therefore, by disposing the insulating substrate 21 between the conductive film 22 and the heating film 24, the shortest distance $L_{min}$ between the conductive film 22 and the heating film 24 can be made sufficiently large, and the electric leakage from the heating film 24 to the conductive film 22 can be suppressed.

Figure 1:
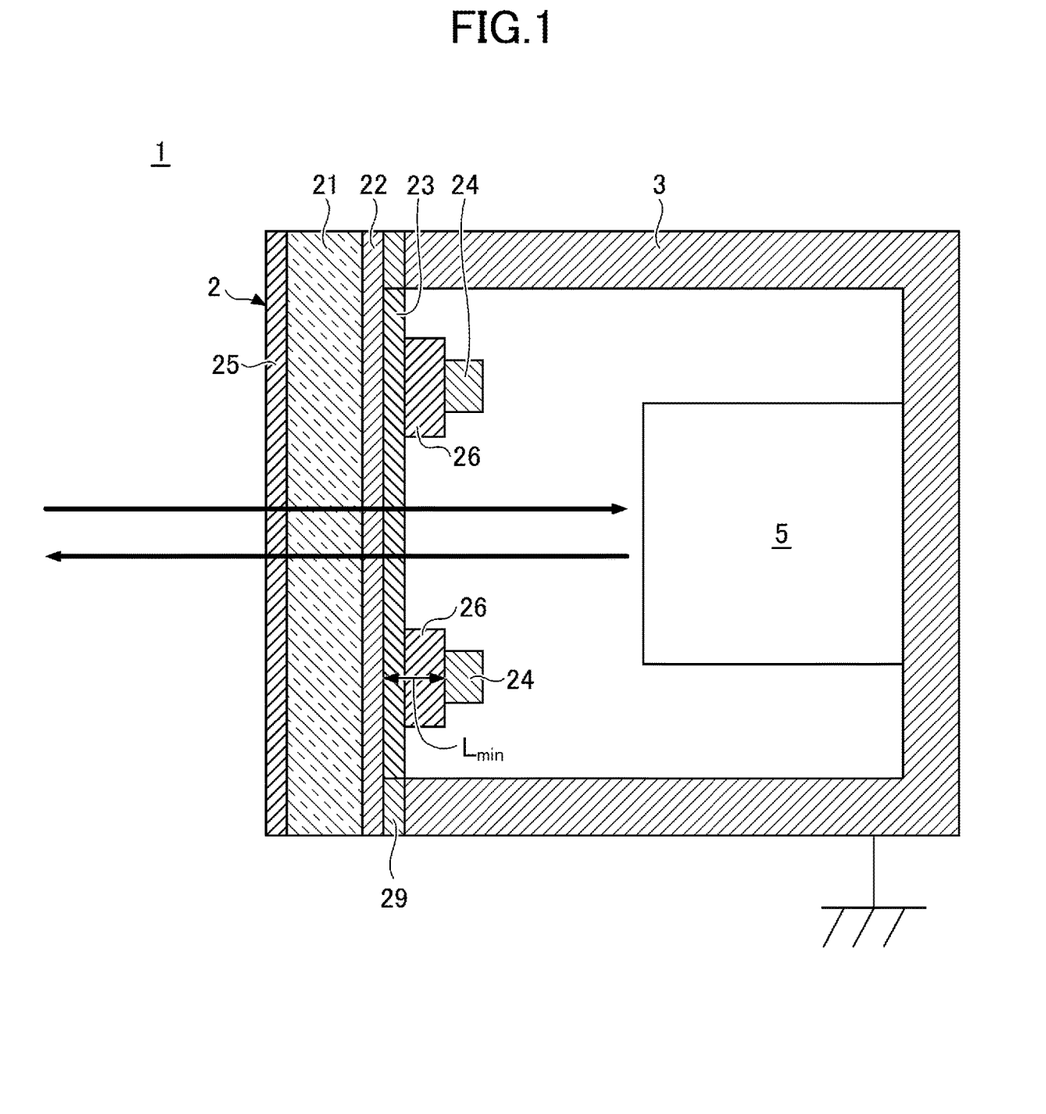
FIG. 1 is a cross-sectional view of a sensor module according to an embodiment of the present disclosure.

Although the insulating film 26 shown in FIG. 1 is not provided between the dielectric multilayer film 23 and the heating film 24 shown in FIG. 3, the insulating film 26 may be provided therebetween. Further, the second dielectric multilayer film 25 need not be provided, and the dielectric multilayer film 23 may be provided at the position of the second dielectric multilayer film 25, and the insulating substrate 21 alone may be present between the conductive film 22 and the heating film 24. When the thickness of the substrate 21 is 2.0 μm or more, $L_{min}$ is 2.0 μm or more, and thus the electric leakage from the heating film 24 to the conductive film 22 can be suppressed.

(Second Variation)

Figure 4:
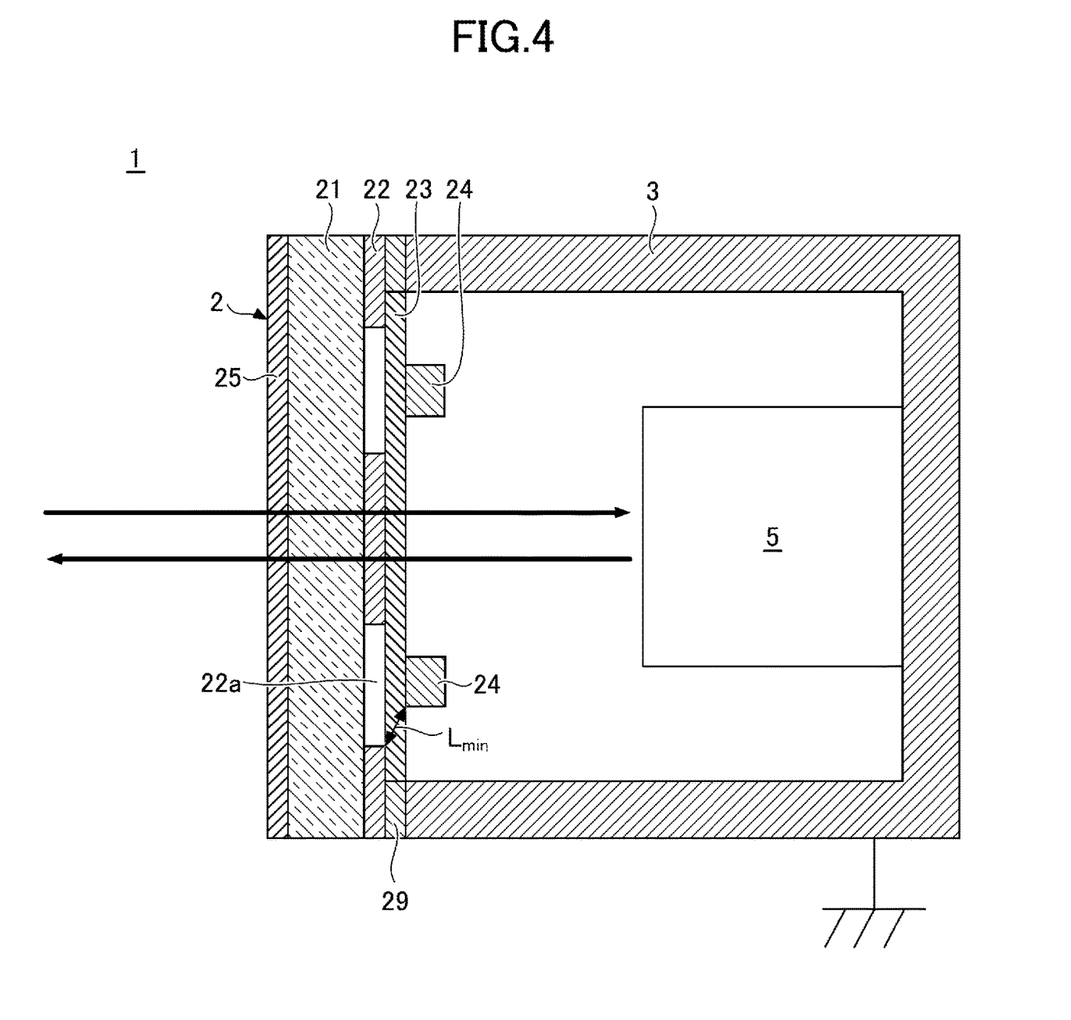
FIG. 4 is a cross-sectional view of a sensor module according to a second variation.

Next, a sensor cover 2 according to a second variation will be described with reference to FIGS. 4 and 5. The following description focuses on the differences. As shown in FIG. 4, the sensor cover 2 may include a second dielectric multilayer film 25, a substrate 21, a conductive film 22, a dielectric multilayer film 23, and a heating film 24 in this order from the outside of the housing 3 toward the inside of the housing 3. The second dielectric multilayer film 25 may be omitted.

As shown in FIG. 4, the conductive film 22 has an opening pattern 22a. The opening pattern 22a may be filled with an insulating material instead of air. As shown in FIG. 5, the heating film 24 is disposed inside a contour of the opening pattern 22a (for example, broken lines in FIG. 5) when viewed in the thickness direction of the conductive film 22.

As shown in FIG. 4, the opening pattern 22a inclines the shortest path between the conductive film 22 and the heating film 24 with respect to the thickness direction of the conductive film 22 (the horizontal direction in FIG. 4). According to this configuration, the shortest distance $L_{min}$ between the conductive film 22 and the heating film 24 can be made longer, and an electric leakage from the heating film 24 to the conductive film 22 can be suppressed.

Figure 5:
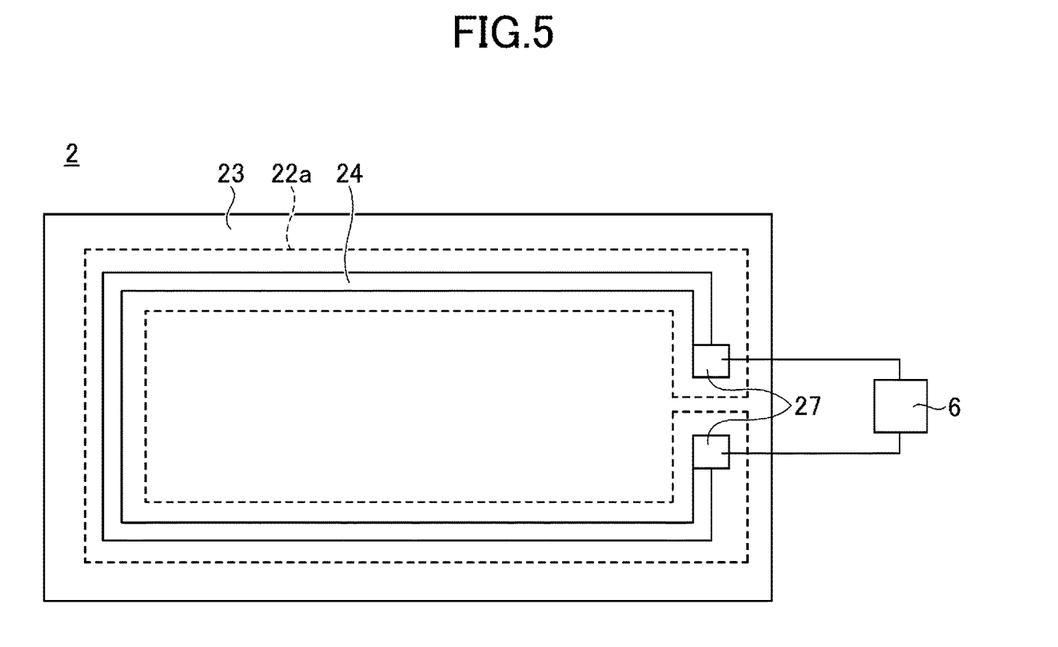
FIG. 5 is a rear view of a sensor cover according to the second variation.

As shown in FIG. 5, the opening pattern 22a may be provided in a band shape along the linearly-shaped heating film 24 when viewed in the thickness direction of the conductive film 22. The opening pattern 22a is formed so that the center of the conductive film 22 and the periphery of the conductive film 22 are electrically connected to each other, and is formed in a C shape, for example. The shape of the opening pattern 22a is not particularly limited. When both ends of the band-shaped opening pattern 22a are not connected to each other and are apart from each other, the center of the conductive film 22 and the periphery of the conductive film 22 are electrically connected to each other, and the center of the conductive film 22 is also electrically connected to the housing 3.

Although the insulating film 26 shown in FIG. 1 is not provided between the dielectric multilayer film 23 and the heating film 24 shown in FIG. 4, the insulating film 26 may be provided therebetween. When the insulating film 26 is provided, the second dielectric multilayer film 25 need not be provided, and the dielectric multilayer film 23 may be provided at the position of the second dielectric multilayer film 25. That is, the insulating film 26 alone may be present between the conductive film 22 and the heating film 24.

Further, as shown in FIG. 4, the substrate 21, the conductive film 22, the dielectric multilayer film 23, and the heating film 24 are arranged in this order, but the conductive film 22, the substrate 21, the dielectric multilayer film 23, and the heating film 24 may be arranged in this order as in the first variation. In the latter case, that is, in a case where the substrate 21 is present between the conductive film 22 and the heating film 24 and the substrate 21 has an insulating property, the second dielectric multilayer film 25 need not be provided and the dielectric multilayer film 23 may be provided at the position of the second dielectric multilayer film 25. The insulating substrate 21 alone may be present between the conductive film 22 and the heating film 24.

EXAMPLE

The experimental data will be described below. The following Examples 1 to 5 and 7 are practical examples, and the following Example 6 is a comparative example.

Figure 6:
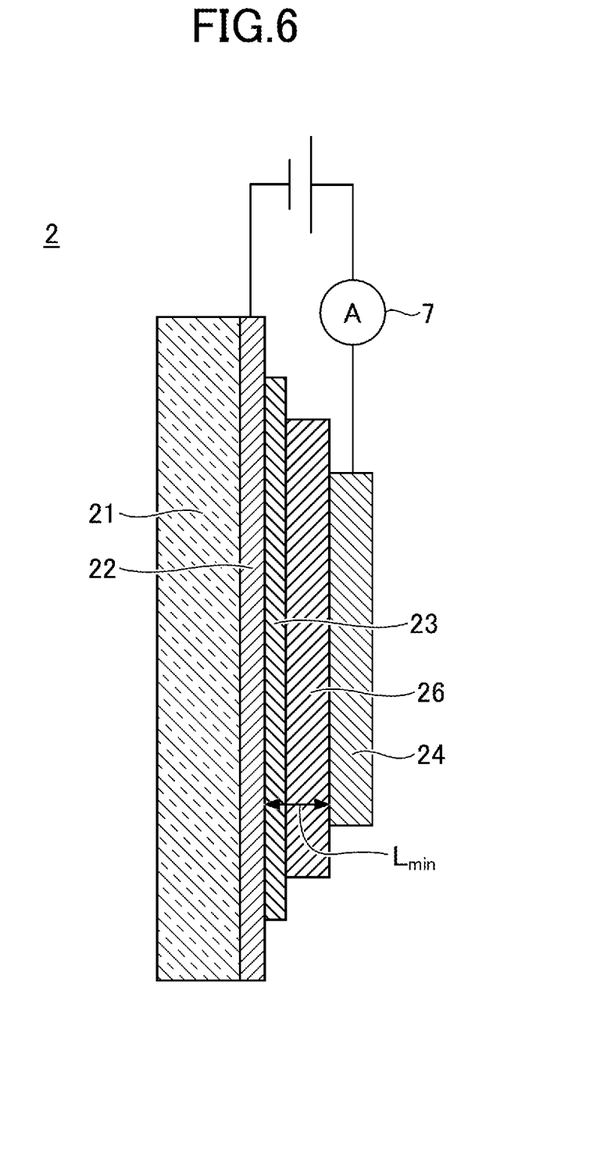
FIG. 6 is a cross-sectional view showing an example of a leakage test.

In Example 1, as shown in FIG. 6, the sensor cover 2 including the substrate 21, the conductive film 22, the dielectric multilayer film 23, the insulating film 26, and the heating film 24 in this order was produced. The substrate 21 was a glass substrate, the conductive film 22 was an ITO film, and the dielectric multilayer film 23 was a multilayer film alternately including an aSi film (amorphous silicon film) and a $SiO_2$ film. The insulating film 26 is a mixture containing resins and silicon dioxide ($SiO_2$), and is formed by applying an insulating paste (product name: Ohmcoat 1057K) manufactured by Nanics Corporation onto the dielectric multilayer film 23 and baking the insulating paste at 200° C. for 30 minutes. The thickness of the insulating film 26 was 1 μm. The heating film 24 is an Ag film, and specifically, is formed by applying an Ag paste onto the insulating film 26 and baking the Ag paste at 150° ° C. for 30 minutes. The film thickness of the heating film 24 was 20 μm. In the electric leakage test, as shown in FIG. 6, a DC voltage of 12 V was applied between the conductive film 22 and the heating film 24, and the presence or absence of electric leakage was examined by measuring presence or absence of current by an ampere meter 7. The result of the leakage test was that no electric leakage was observed.

In Example 2, the sensor cover 2 was produced in the same manner as in Example 1 except that the film thickness of the insulating film 26 was changed to 10 μm. The result of the leakage test was that no electric leakage was observed.

In Example 3, the sensor cover 2 was produced in the same manner as in Example 1 except that the thickness of the insulating film 26 was changed to 20 μm. The result of the leakage test was that no electric leakage was observed.

In Example 4, the sensor cover 2 was produced in the same manner as in Example 1 except that the thickness of the insulating film 26 was changed to 40 μm. The result of the leakage test was that no electric leakage was observed.

In Example 5, the sensor cover 2 was produced in the same manner as in Example 1 except that the material of the insulating film 26 was changed and the film thickness of the insulating film 26 was changed to 20 μm. In Example 5, the insulating film 26 was formed by applying a mixture containing dibismuth trioxide ($Bi_2O_3$), zinc oxide (ZnO), and diboron trioxide ($B_2O_3$), specifically, an insulating paste (product name: US6F-TAX9B) manufactured by AGC Inc., onto the dielectric multilayer film 23 and baking the insulating paste at 450° C. for 10 minutes. The result of the test was that no electric leakage was observed.

In Example 6, the sensor cover 2 was produced in the same manner as in Example 1 except that the heating film 24 was formed directly on the dielectric multilayer film 23 without forming the insulating film 26. The result of the test was that no electric leakage was observed.

In Example 7, the sensor cover 2 was produced in the same manner as in Example 6 except that the total number of laminated layers of the aSi film and the $SiO_2$ film constituting the dielectric multilayer film 23 was increased and the thickness of the dielectric multilayer film 23 was changed to 3.3 μm. The result of the test was that no electric leakage was observed.

The test results of Examples 1 to 7 are shown in TABLE 1.

TABLE 1

| | Dielectric multilayer film | | Insulating film | | | | |
|---|---|---|---|---|---|---|---|
| | Material | Film thickness [μm] | Material | Film thickness [μm] | $L_{min}$ [μm] | $I_{12\,V}$ [mA] | Electric leakage |
| Ex. 1 | aSi/$SiO_2$ | 1.3 | Material A | 1 | 2.3 | 0 | No |
| Ex. 2 | aSi/$SiO_2$ | 1.3 | Material A | 10 | 11.3 | 0 | No |
| Ex. 3 | aSi/$SiO_2$ | 1.3 | Material A | 20 | 21.3 | 0 | No |

TABLE 1-continued

| | Dielectric multilayer film | | Insulating film | | | | |
|---|---|---|---|---|---|---|---|
| | Material | Film thickness [μm] | Material | Film thickness [μm] | $L_{min}$ [μm] | $I_{12\,V}$ [mA] | Electric leakage |
| Ex. 4 | aSi/SiO$_2$ | 1.3 | Material A | 40 | 41.3 | 0 | No |
| Ex. 5 | aSi/SiO$_2$ | 1.3 | Material B | 20 | 21.3 | 0 | No |
| Ex. 6 | aSi/SiO$_2$ | 1.3 | — | — | 1.3 | 8 | Yes |
| Ex. 7 | aSi/SiO$_2$ | 3.3 | — | — | 3.3 | 0 | No |

In TABLE 1, the material A is a mixture containing resins and silicon dioxide (SiO$_2$), and the material B is a mixture containing dibismuth trioxide (Bi$_2$O$_3$), zinc oxide (ZnO), and diboron trioxide (B$_2$O$_3$).

As is clear from TABLE 1, in Examples 1 to 5 and 7, the shortest distances $L_{min}$ between the conductive film 22 and the heating film 24 were 2.0 μm or more, the current value $I_{12V}$ when the voltage of 12 V was applied to the shortest path between the conductive film 22 and the heating film 24 was 1 mA or less, and no electric leakage was observed.

On the other hand, in Example 6, because the shortest distance $L_{min}$ between the conductive film 22 and the heating film 24 was less than 2.0 μm, the current value $I_{12V}$ exceeded 1 mA, and electric leakage was observed.

As described above, the sensor cover and the sensor module according to the present disclosure have been described. However, the present disclosure is not limited to the above-described embodiments and the like. Various changes, modifications, substitutions, additions, deletions, and combinations are possible within the scope of claims. They also of course fall within the technical scope of the present disclosure. The following appendices are disclosed in relation to the above embodiments and the like.

[Appendix 1]
A sensor cover provided in an opening of a housing that houses a sensor, the sensor cover including: a conductor, a dielectric multilayer film, and a heating film in a desired order from an outside of the housing toward an inside of the housing, the conductor and the heating film being insulated from each other, and a shortest distance between the conductor and the heating film being 2.0 μm or more.

[Appendix 2]
The sensor cover according to appendix 1, the conductor being electrically connected to ground.

[Appendix 3]
The sensor cover according to appendix 2, the conductor being electrically connected to the housing as the ground.

[Appendix 4]
The sensor cover according to any one of appendices 1 to 3, the heating film being electrically connected to a power source.

[Appendix 5]
The sensor cover according to any one of appendices 1 to 4, the heating film being formed in a linear shape.

[Appendix 6]
The sensor cover according to any one of appendices 1 to 5, a current value when a voltage of 12 V is applied to a shortest path between the conductor and the heating film being equal to or less than 1 mA.

[Appendix 7]
The sensor cover according to any one of appendices 1 to 6 including the conductor, the dielectric multilayer film, and the heating film in this order from the outside of the housing toward the inside of the housing,
the sensor cover further including an insulating film between the dielectric multilayer film and the heating film.

[Appendix 8]
The sensor cover according to any one of appendices 1 to 6 further including a substrate, the conductor, the substrate, the dielectric multilayer film, and the heating film being arranged in this order from the outside of the housing toward the inside of the housing,
the substrate having an insulating property.

[Appendix 9]
The sensor cover according to any one of appendices 1 to 6, including the conductor, the dielectric multilayer film, and the heating film in this order from the outside of the housing toward the inside of the housing, and
the conductor being a film having an opening pattern, and the heating film being disposed inside a contour of the opening pattern when viewed in a thickness direction of the conductor.

[Appendix 10]
The sensor cover according to any one of appendices 1 to 9, further including a second dielectric multilayer film on a side opposite to the dielectric multilayer film with respect to the conductor.

[Appendix 11]
The sensor cover according to any one of appendices 1 to 10, the sensor cover being an infrared pass filter that transmits near-infrared rays and blocks visible light.

[Appendix 12]
The sensor cover according to any one of appendices 1 to 11, the sensor being a light detection and ranging (LiDAR) sensor.

[Appendix 13]
A sensor module including the sensor cover according to any one of appendices 1 to 12; the housing; and the sensor.

What is claimed is:
1. A sensor cover positioned in an opening of a housing that houses a sensor, the sensor cover comprising:
a conductor;
a dielectric multilayer film; and
a heating film, the conductor, the dielectric multilayer film, and the heating film being positioned in a predetermined order from an outside of the housing toward an inside of the housing,
wherein the conductor is a substrate which comprises a conductive material and has a thickness of 0.1 mm or more,
the conductor and the heating film are insulated from each other,
the conductor is electrically connected to a ground, and
a shortest distance between the conductor and the heating film is 2.0 μm or more.

2. The sensor cover according to claim 1, wherein the housing comprises a conductive material, and the conductor is electrically connected to the housing as the ground.

3. The sensor cover according to claim 1, wherein the heating film is electrically connected to a power source.

4. The sensor cover according to claim 1, wherein the heating film is formed in a linear shape.

5. The sensor cover according to claim 1, wherein a current value when a voltage of 12 V is applied to the shortest path between the conductor and the heating film is equal to or less than 1 mA.

6. The sensor cover according to claim 1, further comprising:
    an insulating film between the dielectric multilayer film and the heating film.

7. The sensor cover according to claim 1, further comprising:
    a second dielectric multilayer film positioned on an opposite side of the conductor from the dielectric multilayer film.

8. The sensor cover according to claim 1, wherein
    the sensor cover is an infrared pass filter configured to transmit near-infrared rays and block visible light.

9. The sensor cover according to claim 1, wherein
    the sensor is a light detection and ranging (LiDAR) sensor.

10. A sensor module, comprising:
    the sensor cover of claim 1;
    the housing; and
    the sensor.

11. The sensor cover according to claim 4, further comprising:
    an insulating film between the dielectric multilayer film and the heating film,
    wherein the insulating film is formed in a band shape along the heating film formed in the linear shape.

* * * * *